United States Patent [19]
Yamamoto et al.

[11] Patent Number: 5,454,464
[45] Date of Patent: Oct. 3, 1995

[54] SOLID ARTICLE CONVEYOR

[75] Inventors: Taizo Yamamoto, Osaka; Hirokazu Konishi, Sakurai, both of Japan

[73] Assignee: Japan Elanco Company Limited, Osaka, Japan

[21] Appl. No.: 199,635

[22] Filed: Feb. 22, 1994

[30] Foreign Application Priority Data

Mar. 18, 1993 [JP] Japan ................... 5-085431

[51] Int. Cl.⁶ ................................. B65Q 47/24
[52] U.S. Cl. ................ 198/384; 198/393; 198/397
[58] Field of Search ................ 198/380, 384, 198/393, 392, 397, 803.14, 478.1, 471.1

[56] References Cited

U.S. PATENT DOCUMENTS

| | | | |
|---|---|---|---|
| 4,208,962 | 6/1980 | Ackley, Sr. et al. | 198/384 X |
| 4,216,714 | 8/1980 | Ackley, Sr. et al. | 198/384 X |
| 4,266,477 | 5/1981 | Ackley | 198/384 X |
| 4,308,942 | 1/1982 | Ackley | 198/393 X |
| 4,353,456 | 10/1982 | Yamamoto | 198/384 X |
| 4,377,971 | 3/1983 | Ackley . | |
| 4,393,973 | 7/1983 | Ackley, Sr. et al. | 198/384 |
| 4,394,933 | 7/1983 | Ackley | 198/397 X |
| 4,632,028 | 12/1986 | Ackley | 198/384 X |
| 4,657,130 | 4/1987 | Ackley, Jr. et al. | 198/397 |
| 4,673,077 | 6/1987 | Taniguchi | 198/393 |
| 4,831,924 | 5/1989 | Cimperman | 198/384 X |

FOREIGN PATENT DOCUMENTS

| | | |
|---|---|---|
| 53-32759 | 9/1978 | Japan . |
| 55-15303 | 4/1980 | Japan . |
| 5-3384 | 1/1986 | Japan . |

Primary Examiner—D. Glenn Dayoan
Attorney, Agent, or Firm—Fish & Richardson

[57] ABSTRACT

In a solid article conveyor, guide grooves and pockets are formed in a manner so that one width of each guide groove and pocket is made narrower than the largest dimension of the solid article. Thus, only one solid article can be contained in each pocket.

20 Claims, 4 Drawing Sheets

SOLID ARTICLE CONVEYOR

FIELD OF THE INVENTION

This invention relates to an improvement of a solid article conveyor for arranging solid articles such as tablets, capsules and the like, which are contained in a hopper at random, and for conveying the arranged solid articles to a printer, a PTP packer and the like.

BACKGROUND OF THE INVENTION

For example, Publication Gazette of Unexamined Japanese patent application Sho 61-10457 describes a conventional solid article conveyor where solid articles such as the tablets, capsules and the like are regularly arranged in pockets which are formed on an outer surface of a drum and the solid articles are conveyed to a process such as printing, PTP packaging and the like.

In the conventional solid article conveyor, numerous pockets are formed on an outer surface of a feeding drum. Each pocket generally has a depth shallower than the largest dimension (diameter) of a solid article in a radial direction perpendicular to a rotation axis of the drum, and has a sectional area wider than the largest sectional area of the solid article in a direction parallel to the rotation axis of the drum. Thus, the solid article is contained in the pocket in a manner so that a section where the solid article has the largest sectional area becomes parallel to the rotation axis of the drum, in a normal operation (not shown in the figure).

A troublesome case of conveyance of solid articles in the conventional solid article conveyor is shown in FIG. 4. As shown in FIG. 4, the pockets 2a to 2d formed on the drum 1 have a depth shallower than the largest dimension of the solid articles 100a to 100d in the radial direction of the drum 1, and have a sectional area wider than the largest sectional area of the solid articles 100a to 100d in the rotation axis of the drum 1. Thus, it is possible that the solid articles 100a to 100d are not normally contained with the pockets 2a to 2d. For example, in the pocket 2a, a plurality of (two) solid articles 100a are contained in one pocket, and the solid articles 100a stand up. In the pocket 2b, the solid article 100b rests on the edge of the pocket 2b. In the pocket 2c, the solid article 100c is not placed at the normal position in the pocket 2c. In the pocket 2d, the solid article 100d is standing, similar to those in the pocket 2a. Namely, the solid articles 100a to 100d protrude from the pockets 2a to 2d.

If the solid articles 100a to 100d, which are abnormally contained in the pockets 2a to 2d, are conveyed to a process such as printing, PTP packaging and the like, the protruding solid articles 100a to 100d will jam between the drum 1 and a guide and the like (not shown in the figure). Thus, the conveyor will not be able to move. Otherwise, the jammed solid articles will be crushed, and the circumferences of the conveyor will be soiled. For preventing such troubles shown in FIG. 4, a brush roller 3 is generally provided above and in the vicinity of the drum 1 for removing or repelling the solid articles 100a to 100d which are abnormally contained in the pockets 2a to 2d.

When the solid articles 100a to 100d in the pockets 2a to 2d are removed, the jamming of the solid articles between the drum and the guide can be prevented. The pockets 2a to 2d, however, are emptied by removing the solid articles 100a to 100d. Thus, the empty pockets derive the following new troubles.

In a solid article printer, the quantity of an ink spread on a transfer roller should be adjusted to just the quantity necessary to print a pattern on a surface of one solid article. If a pocket of the conveyor is not filled by the solid article, the ink pattern on the transfer roller may not be transferred to any solid article and will remain on the transfer roller. When a new ink pattern is spread over the old ink pattern on the transfer roller in the next printing operation, the quantity of the ink pattern on the transfer roller will be surplus. Thus, the surplus ink will be the cause of printing errors. For example, the printed pattern such as a letter, a mark and the like will be blotted or the lines of the pattern will be widened.

On the other hand, in a PTP packer, PTP packages having numerous pockets are supplied in synchronism with the conveyance of the solid article. If a pocket of the conveyor is not filled by the solid article, the pocket of the PTP package corresponding to the empty pocket of the conveyor will be empty. As a result, an inferior package in which at least one pocket is left empty may occur.

SUMMARY OF THE INVENTION

An object of this invention is to solve the abovementioned problems of the conventional solid article conveyor, and to provide an improved solid article conveyor where all pockets are filled by solid articles and no pocket contains more than one solid article.

For attaining the above-mentioned object, a solid article conveyor in accordance with the invention comprises:

guide means for restricting directions of solid articles which are contained in a hopper at random, and lining up the solid articles in a manner so that a section of each solid article having the largest sectional area is substantially vertical;

first conveying means having numerous first pockets arranged on a line and moving the first pockets just below the guide means one by one for receiving the solid articles from the guide means, each of the first pockets holding only one solid article in a manner that the section is substantially perpendicular to an opening of the first pocket;

second conveying means having numerous second pockets arranged on a line and moving the second pockets in synchronism with movement of the first pockets, each of the second pockets holding only one solid article which is just transferred from the first pockets in a manner so that the section is substantially perpendicular to an opening of the second pocket; and restriction means for forcing down the solid article which is held in the second pocket to make the section parallel to the opening of the second pocket.

In the solid article conveyor configured above, it is preferable that the opening of the first pocket has a rectangular shape, a width of the opening is narrower than the largest dimension of the solid article and the other width is substantially the same as but a little wider than the largest dimension of the solid article; and the opening of the second pocket has a rectangular shape, and both widths of the opening are wider than the largest dimension of the solid article.

Furthermore, it is preferable that the restriction means is a plate provided in the vicinity of said second conveying means with a predetermined gap and having an acute-angled cutting facing the second pocket to which the solid article held by the second pocket is to be contacted.

Furthermore, it is preferable that the second pocket has a first and second part, a depth of the first part is deeper than that of the second part, the first part holds the solid article in a manner so that the section is substantially perpendicular to the opening, and the second part holds the solid article in a manner so that the section is substantially parallel to the opening.

Furthermore, it is preferable that the width of the opening of the first pocket narrower than the largest dimension of the solid article is substantially perpendicular to a moving direction of the first pocket.

Furthermore, it is preferable that the first part and the second part of the second pocket are adjoining in a direction substantially perpendicular to a moving direction of the second pocket.

Furthermore, it is preferable that the first conveying means is a rotary drum.

Furthermore, it is preferable that the second conveying means is a rotary drum provided below the first conveying means and rotating in a direction opposite to the rotation direction of the first conveying means.

Furthermore, it is preferable that the first conveying means has an air suction means for sucking air in the first pocket facing the guide means for forcibly receiving the solid article from the guide means.

Furthermore, it is preferable that the first conveying means has an air blowing means for blowing air into the first pocket facing the second pocket to forcibly transfer the solid article to the second pocket.

Furthermore, it is preferable that the second conveying means has an air suction means for sucking air in the second pocket facing the first pocket for forcibly receiving the solid article from the first pocket.

Furthermore, it is preferable that the first conveying means has an air blowing means for blowing air into the first pocket facing the second pocket to forcibly transfer the solid article to the second pocket; and the second conveying means has an air suction means for sucking air in the second pocket facing the first pocket for forcibly receiving the solid article from the first pocket.

Alternatively, a solid article conveyor in accordance with the invention comprises:

a hopper containing solid articles;

guide grooves provided on the bottom of the hopper, with each having a width narrower than the largest dimension of the solid articles for restricting the direction of the solid articles;

a feeding drum having first pockets which are regularly arranged and rotated in a predetermined speed for facing the guide grooves, each first pocket having a rectangular opening, and a width of the opening being narrower than the largest dimension of the solid article for conveying the solid article in a manner so that a section of the solid article having a largest sectional area is substantially perpendicular to a rotation axis of the feeding drum;

a restriction drum provided below the feeding drum, having second pockets which are regularly arranged and rotated in synchronism with the first pockets, each second pocket holding the solid article which is just transferred from the feeding drum in a manner so that the section is substantially perpendicular to a rotation axis of the restriction drum, and also being able to hold the solid article in a manner so that the section is substantially parallel to the rotation axis of the restriction drum; and a restriction guide plate provided in the vicinity of the restriction drum with a predetermined gap for changing the section from a direction substantially perpendicular to the rotation axis of the restriction drum to a direction parallel to the rotation axis of the restriction drum.

In the solid article conveyor configured above, it is preferable that the opening of the first pocket has a rectangular shape, a width of the opening is narrower than the largest dimension of the solid article and the other width is substantially the same as but a little wider than the largest dimension of the solid article; and the opening of the second pocket has a rectangle shape, and both widths of the opening are wider than the largest dimension of the solid article.

Furthermore, it is preferable that the restriction guide plate has an acute-angled cutting facing the second pocket to which the solid article held by the second pocket is to be contacted.

Furthermore, it is preferable that the second pocket has a first and second part, a depth of the first part is deeper than that of the second part, the first part holds the solid article in a manner so that the section is substantially perpendicular to the rotation axis of the restriction drum, and the second part holds the solid article in a manner so that the section is substantially parallel to the rotation axis of the restriction drum.

Furthermore, it is preferable that the width of the opening of the first pocket narrower than the largest dimension of the solid article is substantially perpendicular to a rotation direction of the feeding drum.

Furthermore, it is desirable that the first part and the second part of the second pocket are adjoining in a direction substantially parallel to the rotation axis of the restriction drum.

Furthermore, it is preferable that the feeding drum has an air suction means for sucking air in the first pockets facing the guide grooves for forcibly receiving the solid articles from the guide grooves.

Furthermore, it is preferable that the feeding drum has an air blowing means for blowing air into the first pocket facing the second pocket to forcibly transfer the solid article to the second pocket.

Furthermore, it is preferable that the restriction drum has an air suction means for sucking air in the second pocket facing the first pocket for forcibly receiving the solid article from the first pocket.

In the above-mentioned solid article conveyor in accordance with the invention, since the width of the guide grooves is narrower than the largest dimension of the solid articles, the solid articles are piled up in a predetermined direction, for example, vertical in the grooves. Thus, the solid articles may not be piled up in a manner so that the section of the solid article having the largest area becomes horizontal in the guide grooves.

The first pockets are formed on, for example, the outer surface of the feeding drum, and the feeding drum has the suction means for forcibly receiving the solid articles in the first pockets from the guide grooves. Furthermore, the feeding drum is rotated at a predetermined speed, and the first pockets are moved one by one to face the guide grooves. Thus, when the first pockets pass just below the guide grooves, the lowest of the solid articles piled up in their respective guide grooves are sucked into the first pockets. Since the width of the opening of the first pocket, which is substantially perpendicular to the section of the solid article having the largest sectional area, is narrower than the largest dimension or largest width of the solid article, the solid article is held in the first pocket in a manner so that the section of the solid article having the largest sectional area is substantially perpendicular to the opening of the first pocket.

The restriction drum is rotated to make the second pockets move in synchronism with and facing the first pockets. The solid articles conveyed by the first pockets are transferred to the second pockets at a predetermined position, for example, the lowest position of the feeding drum. The solid article in the second pocket, which is just transferred from the first pocket, is held in a manner so that the the section of the solid article having the largest sectional area is substantially perpendicular to the opening of the second pocket or perpendicular to the rotation axis of the restriction drum. When the second pockets are moved in a predetermined stroke, the solid articles held in the second pocket contact the acute-angled cutting of the restriction guide plate, and the solid articles are forced down. As a result, the solid articles are held in the second pockets in a manner so that the section having the largest sectional area becomes substantially parallel to the opening or the rotation axis. Each second pocket has the first part having a deeper depth for holding the solid article substantially vertical and the second part having a shallower depth for holding the solid article substantially horizontal; thus, the solid article held substantially horizontal will not protrude from the second pocket.

DETAILED DESCRIPTION OF THE INVENTION

Figure 1:
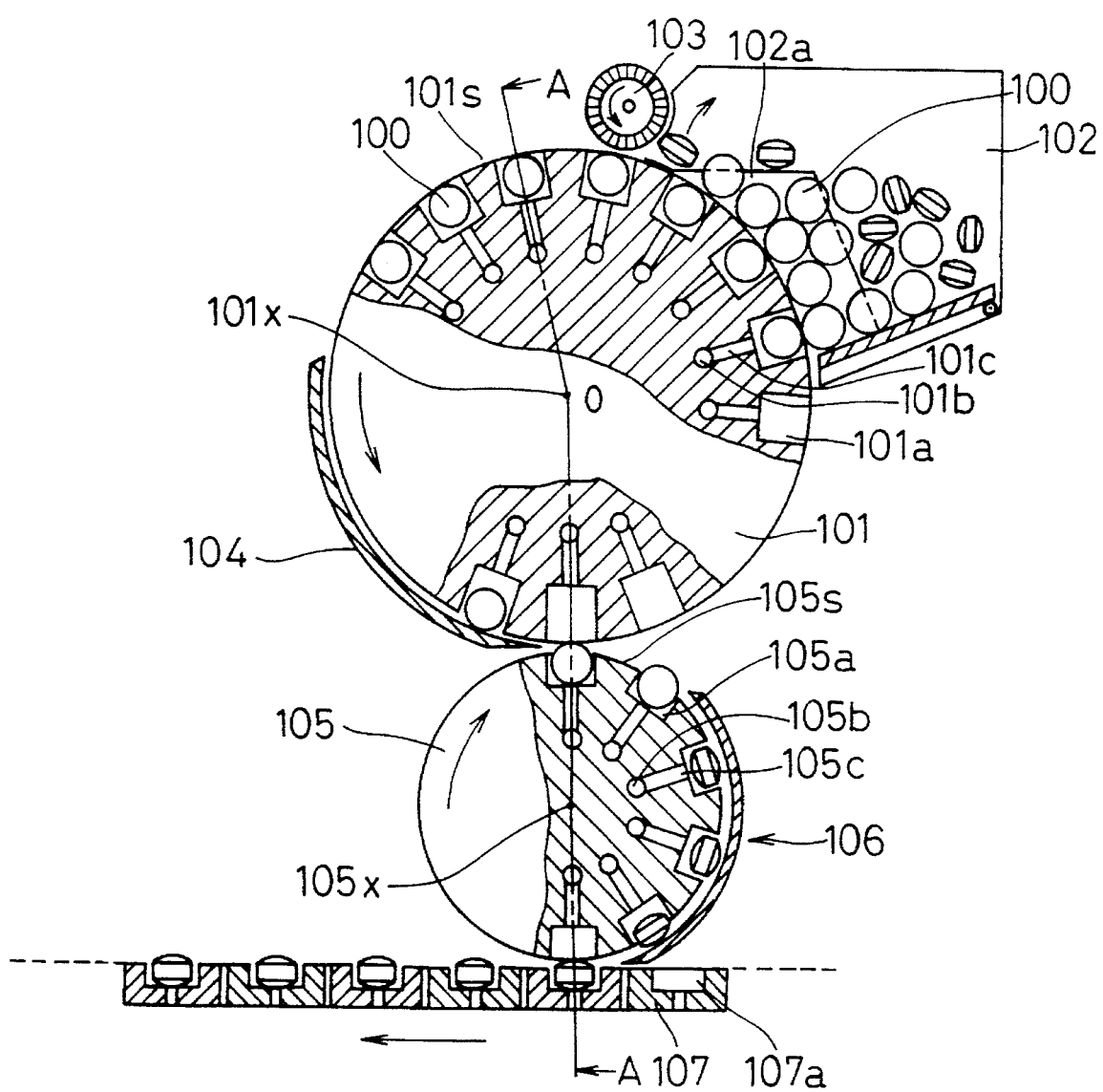
FIG. 1 is a sectional side view showing a solid article conveyor in accordance with the invention.
Figure 2:
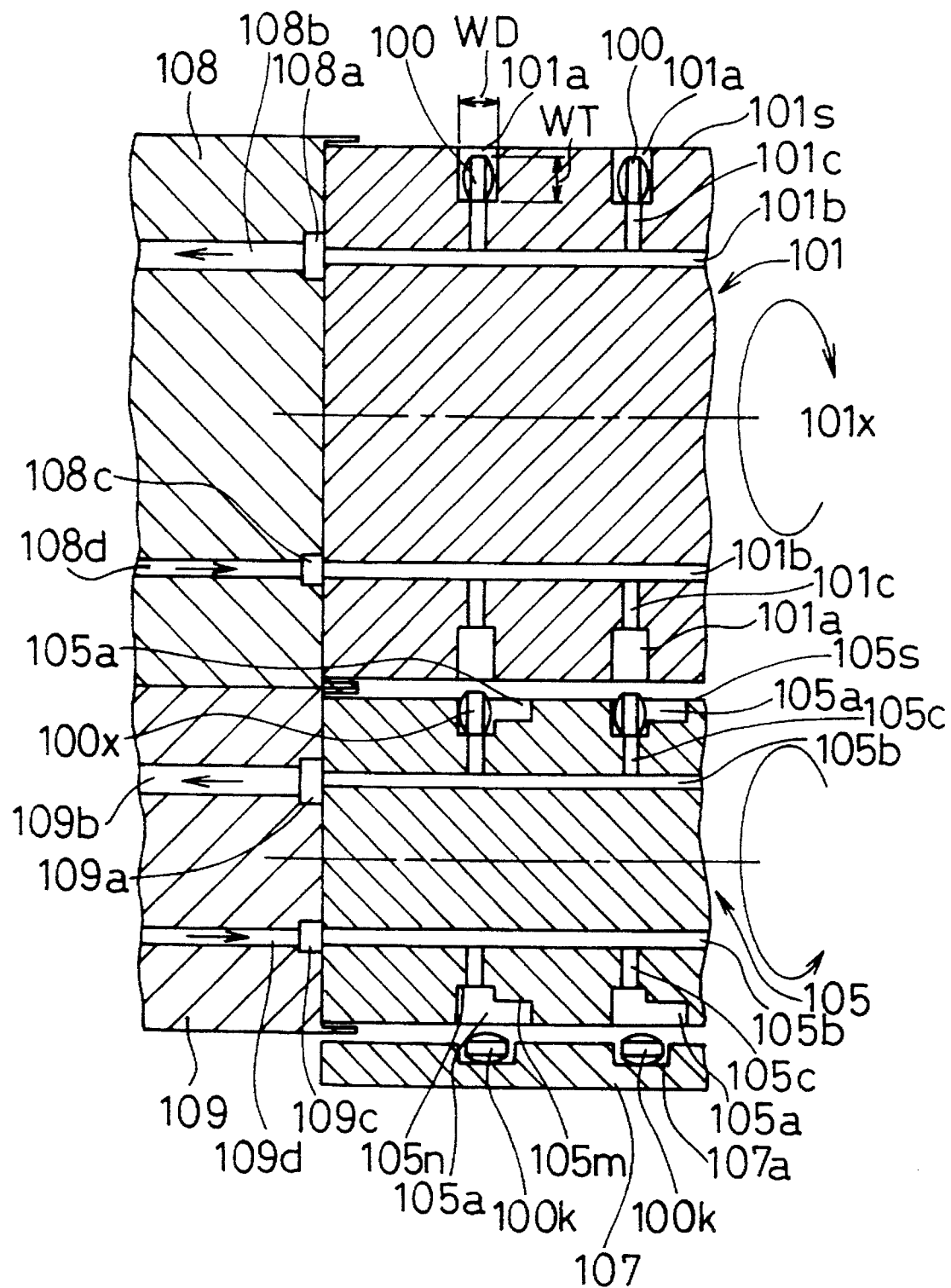
FIG. 2 is a sectional front view showing the A—A section in FIG. 1.
Figure 3:
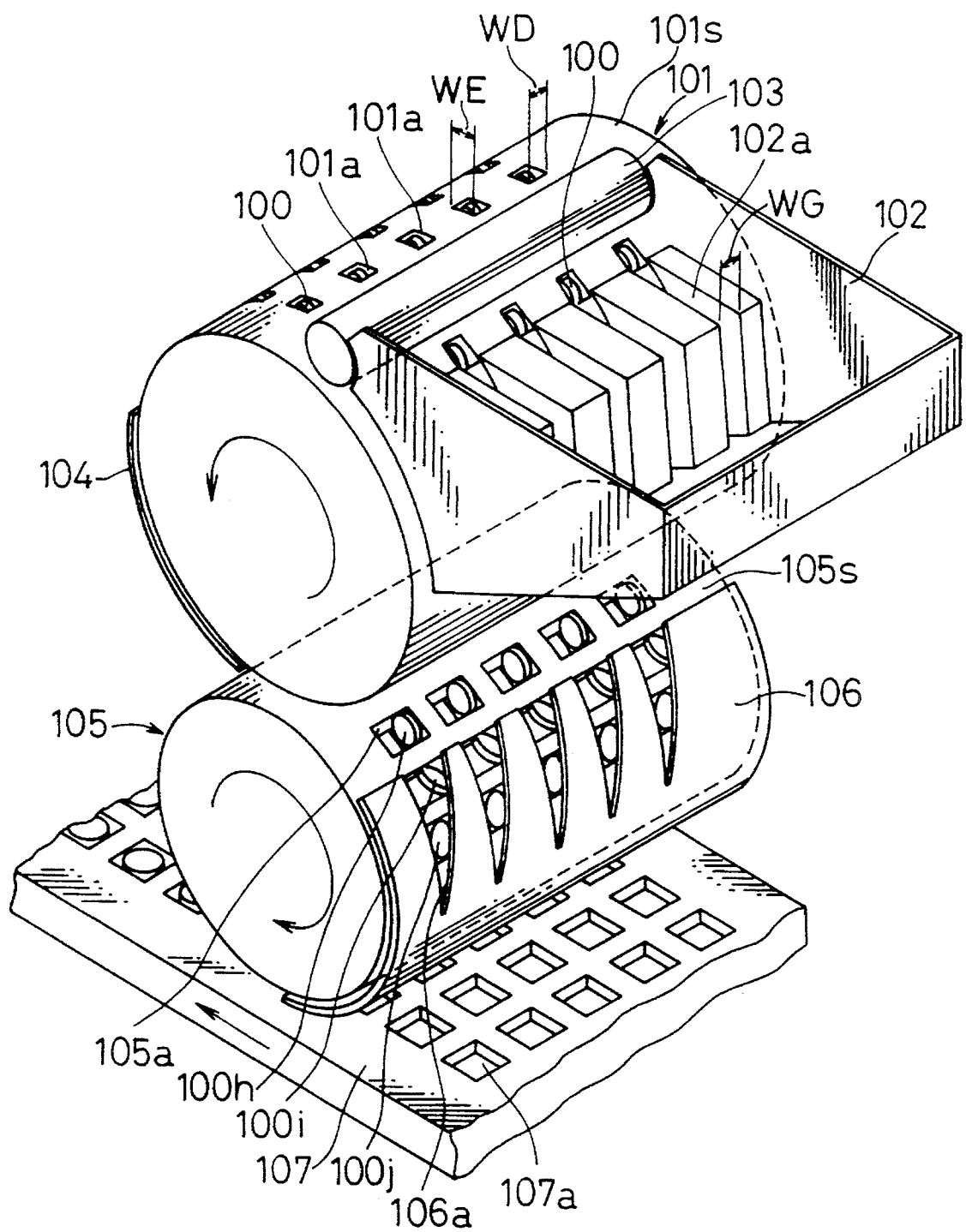
FIG. 3 is a perspective view showing the solid article conveyor shown in FIG. 1.

A preferred embodiment of the solid article conveyor in accordance with the invention is described referring to FIGS. 1 to 3. FIG. 1 shows a sectional side view of the solid article conveyor, FIG. 2 shows the A—A section in FIG. 1 and FIG. 3 is a perspective view showing the solid article conveyor shown in FIG. 1.

Figure 4:
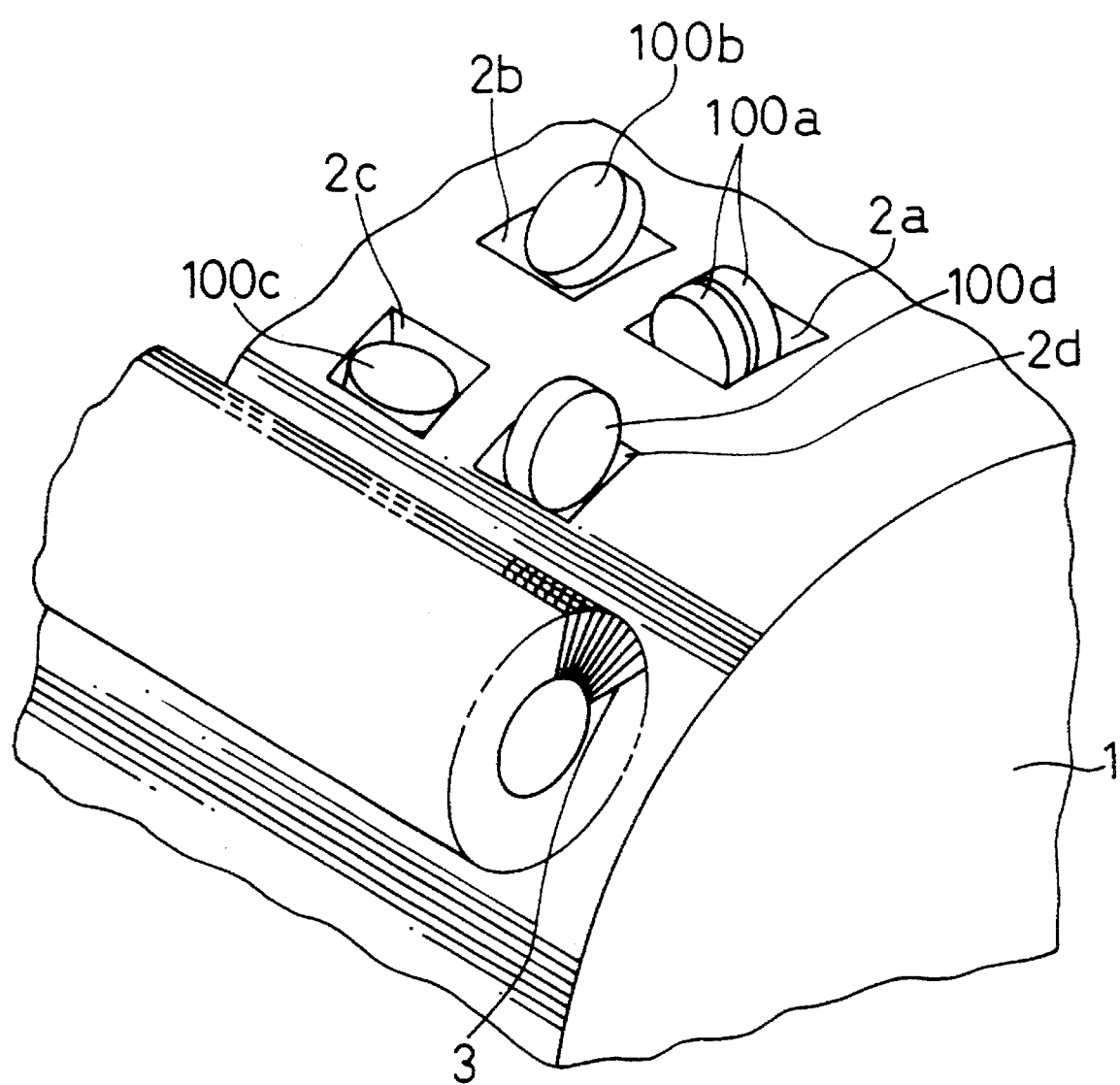
FIG. 4 is a perspective view showing solid articles abnormally contained in the pockets of the conventional solid article conveyor.

As shown in FIGS. 1 and 3, a feeding drum 101 has first pockets 101a which are regularly arranged on an outer surface 101s of the feeding drum 101. Each first pocket 101a holds a solid article 100 such as tablet, capsule and the like in a manner so that a section of the solid article 100 having the largest sectional area is to be substantially vertical or substantially perpendicular to a rotation axis 101x (hereinafter abbreviated as vertical direction). As shown in FIGS. 2 and 3, each of the first pockets 101 has a rectangular shape, and a width WD of the first pocket 101a in a direction parallel to the rotation axis 101x of the feeding drum 101 is narrower than the largest dimension or width WT among the dimensions of the solid article 100 in respective directions. The other width WE of the first pocket 101a substantially parallel to the moving direction of the first pocket 101a is substantially the same as, but a little larger than, the largest dimension of the solid articles 100. The depth of the first pocket 101a is made deeper than that of the conventional pocket solid article conveyor shown in FIG. 4 so that the solid article 100 contained in the first pocket 101a will not protrude from the outer surface 100s of the feeding drum 101. Thus, one of the first pockets 101a can contain only one solid article 100. As shown in FIG. 1, in a section perpendicularly crossing the rotation axis 101x of the feeding drum 101, the same number of horizontal air tubes 101b as the first pockets 101a are provided in the feeding drum 101 at a fixed angle and parallel to the rotation axis 101x. Furthermore, respective first pockets 101a and horizontal air tubes 101b are connected by vertical air tubes 101c which are provided in a radial direction of the feeding drum 101 at the same fixed angle as the horizontal air tube 101b.

As shown in FIGS. 1 and 3, a hopper 102 and a brush roller 103 are provided above the feeding drum 101. The hopper 102 contains many solid articles 100, and the brush roller 103 removes surplus solid articles 100 on the outer surface 101s of the feeding drum 101. Numerous guide grooves 102a are arranged on the bottom of the hopper 102 in a direction parallel to the rotation axis 101x of the feeding drum 101. These guide grooves 102a pile up the solid articles 100 in the afore-mentioned vertical direction. As shown in FIG. 3, a width WG of the guide grooves 102a is narrower than the largest dimension WT of the solid articles 100. Thus, the solid articles 100 are piled up in the vertical direction in the guide grooves 102a shown in FIG. 1. Furthermore, vibrations can be applicable to the hopper 102 to enhance the piling up of the solid articles 100 in the vertical direction in the guide grooves 102a.

As shown in FIGS. 1, 2 and 3, a restriction drum 105, which rotates in the opposite direction to the feeding drum 101, is provided just below the feeding drum 101. On an outer surface 105s of the restriction drum 105, regularly arranged second pockets 105a are provided. The feeding drum 101 and the restriction drum 105 are respectively driven in a manner so that the movement of the first pockets 101a and the movement of the second pockets 105a are synchronized with each other. As shown in FIG. 1, in a section perpendicularly crossing a rotation axis 105x of the restriction drum 105, the same number of horizontal air tubes 105b as the second pockets 105a are provided in the restriction drum 105 at a fixed angle and parallel to the rotation axis 105x. Furthermore, respective first pockets 105a and the horizontal air tubes 105b are connected by vertical air tubes 105c which are provided in a radial direction of the restriction drum 105 at the same fixed angle as the horizontal air tubes 105b.

As shown in FIG. 2, each second pocket 105a provided on the restriction drum 105 has a rectangular shape, and a width in a direction substantially parallel to the moving direction of the second pockets 105a or substantially perpendicular to the rotation axis 105x of the restriction drum 105. Furthermore, the second pocket 105a has a first part 105n and a second part 105m which have respectively different depths from the outer surface 105s in the section parallel to the rotation axis 105x. The depth of the first part 105n is deeper than the depth of the second part 105m. The first part 105n and the second part 105m are adjoining in a direction parallel to the the rotation axis 105x. The first part 105n of the second pocket 105 receives the solid article 100x dropped from the first pocket 101a of the feeding drum 101, and holds the solid article 100x in the vertical direction. On the other hand, the second part 105m of the second pocket 105a holds the solid article 100 in a manner so that the section having the largest sectional area is substantially parallel to the opening of the second pocket or substantially parallel to the rotation axis 105x (hereinafter abbreviated as a lateral direction).

As shown in FIGS. 1 and 3, a guide plate 104 is provided in the vicinity of the outer surface 101s of the feeding drum 101 and below the rotation axis 101x to prevent the solid articles 100 from dropping out of the first pockets 101a by gravity. Similarly, a restriction guide plate 106 is provided on the vicinity of the outer surface 105s of the restriction drum 105 and below the rotation axis 105x to prevent the solid articles 100 from dropping out of the second pockets 105a by gravity.

The restriction guide plate 106 further has a function for restricting the direction of the solid articles 100 contained in the second pockets 105a of the restriction drum 105. That is, as shown in FIG. 3, the solid article 100h dropped from the first pocket 101a of the feeding drum 101 and conveyed in the vertical direction in the second pocket 105a contacts an acute-angled cutting 106a of the restriction guide plate 106. When the solid article 100i contacts the cutting 106a of the restriction guide plate 106, it receives a reaction force from the restriction guide plate 106 and is forced down. The solid article 100j thrown down by the restriction guide plate 106 is held in the afore-mentioned lateral direction in the second part 105m of the second pocket 105a.

In FIGS. 1, 2 and 3, a slat 107 such as a belt conveyor and the like is provided below the restriction drum 105. The slat 107 has regularly arranged third pockets 107a, and is driven in a, direction shown by arrows in FIGS. 1 and 3 in a manner so that the third pockets 107a are moved in synchronism with the second pockets 105a. As shown in FIG. 3, the solid articles 100h to 100j held by the second pockets 105a are changed in position from the vertical direction to the lateral direction when they are conveyed by the restriction drum 105. Thus, the solid article 100k is arranged and conveyed in the horizontal direction when the solid article 100 is transferred from the second pocket 105a to the third pocket 107a on the slat 107. After that, the slat 107 conveys the solid articles 100 to the next step such as a printer, PTP packer and the like.

As shown in FIG. 2, fixed air units 108 and 109 are respectively connected to the feeding drum 101 and the restriction drum 105. These air units 108 and 109 are omitted in FIGS. 1 and 3 to simplify the drafting. As mentioned above, the horizontal air tubes 101b and the vertical air tubes 101c are provided in the feeding drum 101. In the air unit 108, an air suction groove 108a and an air suction tube 108b are provided. The air suction tube 108b connects the air suction groove 108a to a vacuum pump (not shown in the figure). The air suction groove 108a is circularly formed, for example, between the hopper 102 and the guide plate 104 in a part above the rotation axis 101x of the feeding drum 101. Thus, the air in the first pockets 101a is sucked through the horizontal air tubes 101b, the vertical air tubes 101c, the air suction groove 108a and the air tube 108b by the vacuum. Generally, vibrations and the like are continuously applied to the hopper 102. However, there is no guarantee that all the first pockets 101a will be filled by the solid articles 100 which are dropped from the hopper 102 by gravity and/or the vibrations. Thus, the solid articles 100 are forcibly sucked in the pockets 101a by the vacuum. Similarly, in case of transferring the solid articles 100 from the first pockets 101a of the feeding drum 101 to the second pockets 105a of the restriction drum 105, compressed air is relied on more than gravity. For that purpose, an air blowing groove 108c and an air supplying tube 108d are provided in the lower part of the air unit 108.

Furthermore, as mentioned above, the horizontal air tube 105b and the vertical air tube 105c are provided in the restriction drum 105. In the air unit 109, an air suction groove 109a and an air suction tube 109b are provided. The air suction tube 109b connects the air suction groove 109a to a vacuum pump (not shown in the figure). The air suction groove 109a is circularly formed from, for example, the highest part of the restriction drum 105 to the restriction guide plate 106 in a part above the rotation axis 105x of the restriction drum 105. Thus, the air in the second pockets 105a is sucked through the horizontal air tubes 105b, the vertical air tubes 105c, the air suction groove 109a and the air tube 109b by the vacuum. Similarly, in case of transferring the solid articles 100 from the second pockets 105a of the restriction drum 105 to the third pockets 107a of the slat 107, compressed air is relied on more than gravity. For the purpose, an air blowing groove 109c and an air supplying tube 109d are provided in the lower part of the air unit 109.

In the above-mentioned embodiment, the solid article conveyor is configured so that the solid articles 100 are at first transferred from the feeding drum 100 to the restriction drum 105; the conveying states of the solid articles 100 are changed from the vertical direction to the lateral direction by the restriction guide plate 106 on the restriction drum 105, and the solid articles 100 are twice transferred, to the restriction drum 105 and then to the slat 107. The solid articles 100, however, can be transferred from the feeding drum 101 to the slat 107 directly, with the restriction guide plate 106 provided slightly above the slat 107. Thus, the conveying states of the solid articles 100 can be changed from the vertical direction to the lateral direction. Alternatively, the shape of the third pocket 107a of the slat 107 can be made substantially the same as that of the second pocket 105a of the restriction drum 105. In this case, the solid articles 100 can be transferred to the third pockets 107a of the slat 107 directly, and the conveying state of the solid articles can be changed from the vertical direction to the lateral direction by the restriction guide plate 106.

The invention may be embodied in other specific forms without departing from the spirit and scope thereof. The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A solid article conveyor comprising:

guide means for restricting directions of solid articles which are contained in a hopper at random, and lining up said solid articles in a manner so that a section of each solid article having the largest sectional area is substantially vertical;

first conveying means having numerous first pockets arranged on a line and moving said first pockets just below said guide means one by one for receiving said solid articles from said guide means, each of said first pockets holding only one solid article in a manner that said section is substantially perpendicular to an opening of said first pocket;

second conveying means having numerous second pockets arranged on a line and moving said second pockets in synchronism with movement of said first pockets, each of said second pockets holding only one solid article which is just transferred from said first pockets in a manner so that said section is substantially perpendicular to an opening of said second pocket; and restriction means for forcing down said solid article which is held in said second pocket to make said section parallel to said opening of said second pocket, wherein said opening of said first pocket has a rectangular shape, a width of said opening is narrower than the largest dimension of said solid article and the other width is substantially the same as, but at least wider than, the largest dimension of said solid article; and said opening of said second pocket has a rectangular shape, and both widths of said openings are wider than the largest dimension of said solid article.

2. The solid article conveyor in accordance with claim 1, wherein said restriction means is a plate provided in the vicinity of said second conveying means with a predetermined gap and having an acute-angled cutting facing said second pocket to which said solid article held by said second pocket is to be contacted.

3. The solid article conveyor in accordance with claim 1, wherein said second pocket has a first and second part, a depth of said first part is deeper than that of said second part, said first part holds said solid article in a manner so that said section is substantially perpendicular to said opening, and said second part holds said solid article in a manner so that said section is substantially parallel to said opening.

4. The solid article conveyor in accordance with claim 1, wherein said width of said opening of said first pocket is narrower than the largest dimension of said solid article is substantially perpendicular to a moving direction of said first pocket.

5. The solid article conveyor in accordance with claim 3, wherein said first part and said second part of said second pocket are adjoining in a direction substantially perpendicular to a moving direction of said second pocket.

6. The solid article conveyor in accordance with claim 1, wherein said first conveying means is a rotary drum.

7. The solid article conveyor in accordance with claim 6, wherein said second conveying means is a rotary drum provided below said first conveying means and rotating in the direction opposite to a rotation direction of said first conveying means.

8. The solid article conveyor in accordance with claim 1, wherein said first conveying means has an air suction means for sucking air in said first pocket facing said guide means for forcibly receiving said solid article from said guide means.

9. The solid article conveyor in accordance with claim 8, wherein said first conveying means has an air blowing means for blowing air into said first pocket facing said second pocket to forcibly transfer said solid article to said second pocket.

10. The solid article conveyor in accordance with claim 8, wherein said second conveying means has an air suction means for sucking air in said second pocket facing said first pocket for forcibly receiving said solid article from said first pocket.

11. The solid article conveyor in accordance with claim 8, wherein said first conveying means has an air blowing means for blowing air into said first pocket facing said second pocket to forcibly transfer said solid article to said second pocket; and said second conveying means has an air suction means for sucking air in said second pocket facing said first pocket for forcibly receiving said solid article from said first pocket.

12. A solid article conveyor comprising:

a hopper containing solid articles;

guide grooves provided on the bottom of said hopper, with each having a width narrower than the largest dimension of said solid articles for restricting the direction of said solid articles;

a feeding drum having first pockets which are regularly arranged and rotated at a predetermined speed to face said guide grooves, each first pocket having a rectangular opening, and a width of said opening being narrower than the largest dimension of said solid article to convey said solid article in a manner so that a section of said solid article having a largest sectional area is substantially perpendicular to a rotation axis of said feeding drum;

a restriction drum provided below said feeding drum, having second pockets which are regularly arranged and rotated in synchronism with said first pockets, each second pocket holding said solid article which is just transferred from said feeding drum in a manner so that said section is substantially perpendicular to a rotation axis of said restriction drum, and also being able to hold said solid article in a manner so that said section is substantially parallel to said rotation axis of said restriction drum; and a restriction guide plate provided in the vicinity of said restriction drum with a predetermined gap for changing said section from a direction substantially perpendicular to said rotation axis of said restriction drum to a direction parallel to said rotation axis of said restriction drum.

13. The solid article conveyor in accordance with claim 12, wherein said opening of said first pocket has a rectangular shape, a width of said opening is narrower than the largest dimension of said solid article and the other width is substantially the same as, but at least wider than, the largest dimension of said solid article; and said opening of said second pocket has a rectangular shape, and both widths of said opening are wider than the largest dimension of said solid article.

14. The solid article conveyor in accordance with claim 12, wherein said restriction guide plate has an acute-angled cutting facing said second pocket to which said solid article held by said second pocket is to be contacted.

15. The solid article conveyor in accordance with claim 12 or 13, wherein said second pocket has a first and second part, a depth of said first part is deeper than that of said second part, said first part holds said solid article in a manner so that said section is substantially perpendicular to said rotation axis of said restriction drum, and said second part holds said solid article in a manner so that said section is substantially parallel to said rotation axis of said restriction drum.

16. The solid article conveyor in accordance with claim 13 wherein said width of said opening of said first pocket narrower than the largest dimension of said solid article is substantially perpendicular to a rotation direction of said feeding drum.

17. The solid article conveyor in accordance with claim 16, wherein
said first part and said second part of said second pocket are adjoining in a direction substantially parallel to said rotation axis of said restriction drum.

18. The solid article conveyor in accordance with claim 12, wherein
said feeding drum has an air suction means for sucking air in said first pockets facing said guide grooves for forcibly receiving said solid article from said guide grooves.

19. The solid article conveyor in accordance with claim 18, wherein
said feeding drum has an air blowing means for blowing air into said first pocket facing said second pocket to forcibly transfer said solid article to said second pocket.

20. The solid article conveyor in accordance with claim 18, wherein
said restriction drum has an air suction means for sucking air in said second pocket facing said first pocket for forcibly receiving said solid article from said first pocket.

* * * * *